April 12, 1927.  1,624,388
E. M. BOURNONVILLE
INTERNAL COMBUSTION ENGINE ROTARY VALVE MEMBER
Filed April 1, 1925
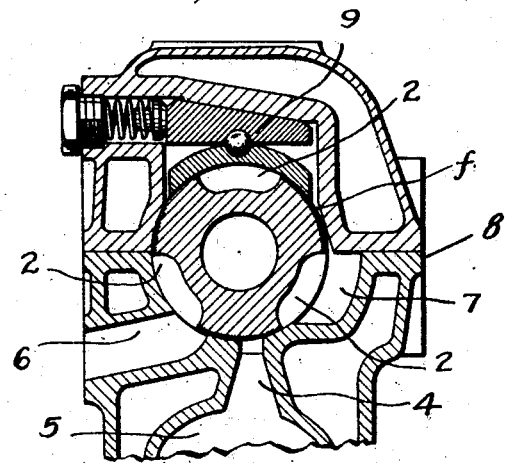
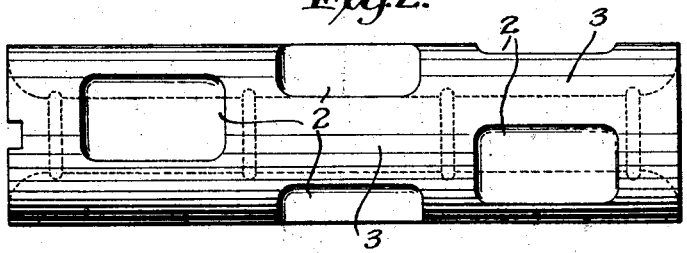
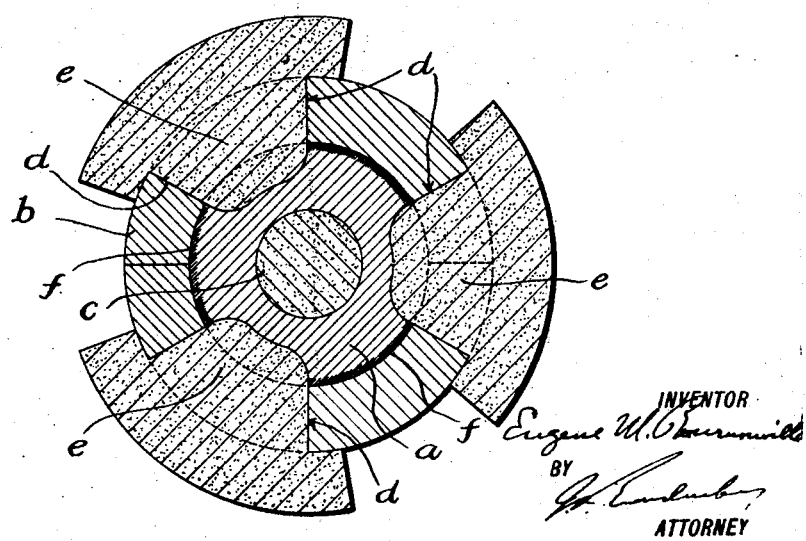
INVENTOR
Eugene M. Bournonville
BY
ATTORNEY Patented Apr. 12, 1927.

1,624,388

UNITED STATES PATENT OFFICE.

EUGENE M. BOURNONVILLE, OF JERSEY CITY, NEW JERSEY.

INTERNAL-COMBUSTION-ENGINE ROTARY VALVE MEMBER.

Application filed April 1, 1925. Serial No. 19,766.

The apparently simple problem of rotary valves for internal combustion or explosion engines, which has received much attention for many years, has presented stubborn difficulties, particularly in respect to the tendency of the valve exposed to hot combustion gases to cut and score, with resulting loss of compression and power and difficult starting. Efforts in the direction of special cooling, lubrication, care in the matter of clearance, etc., have not wholly eliminated this trouble, or at least have not done so for the purposes of economical, quantity production.

I find a great cause of scoring in these valves in particles of gritty material carried by the gas currents to and from the engine cylinder, or combustion chamber, by way of the transfer pockets or ports in the valve. These particles, and particularly very small pieces of flinty carbon resulting from the action of high heat in the cylinder upon the oil used for lubricating and sealing the piston, are caught between the surface of the valve member where it is not cut away for the transfer ports, and the wall of the valve casing, and are carried around by the rotation of the valve member, producing circumferentially extending grooves which form permanent channels between the cylinder port and the intake and exhaust spaces on either hand, in consequence of which leakage develops. This may result even from fine, hard particles swept in by the fuel charges, but is especially due to the carbon particles expelled with the burned gases and for the most part blown out with the exhaust, but occasionally finding lodgment between the curved outer surface of the heated valve and its casing, where they set up a severe cutting.

The purpose of the present invention is to render these abrasive particles harmless, or substantially so, and this is accomplished by making the rotating, pocketed valve member of such material, or treating it in such way, that the edges of the pockets will shear particles that may become caught, while the rounded surface of the member will embed them, if not thus disposed of, in the inner face of the casing, or in a carbon coating formed thereon, this inner face being kept and made smooth by the constant burnishing of the sealing surfaces of the valve member. A practical and advantageous manner of carrying out the invention is to cast an iron valve member in a cylindrical metal mold having openings in which are placed inwardly projecting sand cores to form the port pockets. The metal of the mold chills the outer part of the casting so that it becomes several times as hard as ordinary cast iron, while the pockets need not be chilled. The curved surface of the valve casting is too hard to machine in the usual way, but is brought to the desired diameter and finish by grinding, for which treatment it is well adapted. In this way an accurately made valve member may be obtained at small expense, which will suppress scoring.

In the accompanying drawings forming part hereof:

Fig. 1 is a cross-section of a rotary valve member such as it is the object of the invention to produce, the valve member being shown in its casing;

Fig. 2 is a side view of such a valve member; and

Fig. 3 is a cross-section of a casting for the valve member in its mold.

The valve member illustrated in Fig. 2 is a cylindrical body containing sets of pockets 2 in circumferential zones for serving three cylinders of an engine. In the case of a six cylinder engine there would be two of these sections appropriately coupled and driven. The ports or pockets, it will be observed, occupy, or remove, a large part of the cylindrical outer surface of the valve, leaving comparatively narrow surfaces 3 between pockets for sealing. Hard particles can be rolled and carried by the rotation entirely across these areas in valves as usually made, causing scoring.

Fig. 1 illustrates a port 4 to a cylinder 5, serving alternately for intake and exhaust, and intake and exhaust spaces 6 and 7 on either hand in the casing 8, which casing is of cast-iron or other relatively soft metal. Each port pocket, as the valve is rotated in proper time, connects the cylinder port with the exhaust, permitting the gases of combustion to escape, and thereafter opens the cylinder to the intake, so that fuel gases are drawn in on the suction stroke. It can be expected that the majority of fine pieces either of outside grit or of hard carbon formed in the cylinder, will be swept right through the valve, but it is inevitable that in occasional instances a particle will impinge in such a way that before it can rebound it will be wedged between an advancing surface of the valve member and a stationary surface of the casing, and be shoved along gouging the metal. An individual scratch may be slight or severe; the aggregate effect of repeated occurrences is likely to be highly injurious to the functioning of the valve.

Fig. 3 illustrates a valve casting $a$ made in a cylindrical metal mold $b$, in which is a central core $c$. This mold has openings $d$ in its wall corresponding to the positions and areas of the valve pockets, and sand cores $e$ are inserted inwardly through these openings to define the pockets in the casting; or metal cores might be used if desired. The molten iron where it comes in contact with the surrounding metal mold is chilled and made extremely hard for a certain depth, as indicated roughly at $f$. In consequence, the cylindrical part of the valve, upon which sealing depends, takes on a very different character than that of valves made of soft materials such as steel, cast-iron, bronze or aluminum. Whereas ordinary cast-iron, of which such valves and their casings are usually made, has a hardness measured by the scleroscope of between 25 and 32, or more precisely about 28, the curved portion of my valve, when made in the manner described, will scleroscope at least about 50, and will run as high as between 80 and 90, or even higher.

The casting is made only very slightly larger than the diameter of valve called for, and this excess is effectively removed by grinding in a further step, without, however, taking off more than the outer portion of the chilled metal, so that a hard smooth surface between the transfer ports or pockets 2 is left.

As a result of this construction or mode of manufacture, the extreme edges of the pockets are well adapted to shear or cut to pieces trapped grit particles, while what particles or fragments may enter between the members will be quickly pressed by the surfaces 3 into the face of the valve casing, where they are incapable of injury.

While the method of manufacture of these valves which has been described is especially advantageous, I do not wish to be necessarily limited thereto, as the benefits of the invention might be realized, though less desirably, through the use of case-hardened steel, tempered steel, or special cast-iron alloys. In any event, my purpose is to obtain curved sealing surfaces of the valve member the hardness of which, measured as described, is approximately twice or more as great as that of ordinary cast-iron, or of such material as the valve-casing may be made of.

The automatic compensating device 9 illustrated in the chamber in the top of the valve-casing forms the subject-matter of a separate application.

What I claim as new is:

An internal combustion engine rotary valve member formed with pockets in its sides for the transfer of the gases, and with curved sealing portions between the pockets of a hardness approximately twice or more as great as the valve-casing, so as to render harmless particles carried by the gases, by shearing the same by the edges of its pockets or embedding them by the burnishing action of its surface in the wall of the valve casing.

EUGENE M. BOURNONVILLE.